(12) United States Patent
Florian et al.

(10) Patent No.: US 7,140,285 B2
(45) Date of Patent: Nov. 28, 2006

(54) WIRE CHOPPER MODULE FOR EDM SYSTEM

(75) Inventors: Dana L. Florian, Bristol, CT (US); Kyle B. Florian, Southington, CT (US)

(73) Assignee: Florian Precision, LLC, Plantsville, CT (US)

( * ) Notice: Subject to any disclaimer, the term of this patent is extended or adjusted under 35 U.S.C. 154(b) by 0 days.

(21) Appl. No.: 11/111,294

(22) Filed: Apr. 20, 2005

(65) Prior Publication Data

US 2005/0263635 A1    Dec. 1, 2005

Related U.S. Application Data

(62) Division of application No. 10/139,478, filed on May 6, 2002, now Pat. No. 6,948,413.

(51) Int. Cl.
*B23D 25/02* (2006.01)

(52) U.S. Cl. .................. 83/349; 83/698.41; 83/906; 83/955

(58) Field of Classification Search .................. 83/906, 83/955, 698.41, 331–349; 241/242, 294
See application file for complete search history.

(56) References Cited

U.S. PATENT DOCUMENTS

| | | | |
|---|---|---|---|
| 3,708,129 | A | 1/1973 | Nowak |
| 3,799,020 | A | 3/1974 | Hoelmer |
| 3,899,813 | A | 8/1975 | Lovendahl |
| 4,016,395 | A | 4/1977 | Rietveld |
| 4,242,558 | A | 12/1980 | Kunze |
| 4,422,358 | A | 12/1983 | Hull et al. |
| 4,960,020 | A | 10/1990 | Reinhard |
| 5,042,733 | A | 8/1991 | Hench |
| 5,047,607 | A | 9/1991 | Briffod |
| 5,445,054 | A | 8/1995 | Pryor |
| 5,454,523 | A | 10/1995 | Matsuda |
| 5,549,025 | A | 8/1996 | Muller |
| 5,658,601 | A | 8/1997 | Hoshi |
| 5,756,953 | A | 5/1998 | Lehmann |
| 5,816,301 | A | 10/1998 | Stager |
| 5,833,153 | A | 11/1998 | Ackers et al. |
| 5,945,010 | A | 8/1999 | Tomalin |
| 6,032,884 | A | 3/2000 | Bowling et al. |
| 6,209,432 | B1 | 4/2001 | Matsuda |
| 6,364,227 | B1 | 4/2002 | Dorscht |
| 6,948,413 | B1 * | 9/2005 | Florian et al. ................ 83/349 |

* cited by examiner

*Primary Examiner*—Timothy V. Eley
*Assistant Examiner*—Jason Prone
(74) *Attorney, Agent, or Firm*—Alix, Yale & Ristas, LLP

(57) ABSTRACT

A wire chopper module for processing spent electrode emerging from an EDM system employs replaceable inserts that are also movable relative to the feed path of the electrode. Shifting the position of the inserts relative to the feed path of the electrode allows more than one portion of each cutting edge on the insert to be used. Each insert has more than one cutting edge and can be rotated and re-inserted to present a completely new cutting edge. Removable multi-edge inserts that are repositionable relative to the feed path of the spent electrode permit renewal of the cutting edges of the wire chopper module with increased frequency and reduced cost. The wire chopper module also incorporates a flywheel to increase the movement of inertia of the rotating cutting inserts as an aid in overcoming jams. Sharp cutting edges and increased rotational momentum improve the reliability of the inventive wire chopper module.

5 Claims, 4 Drawing Sheets

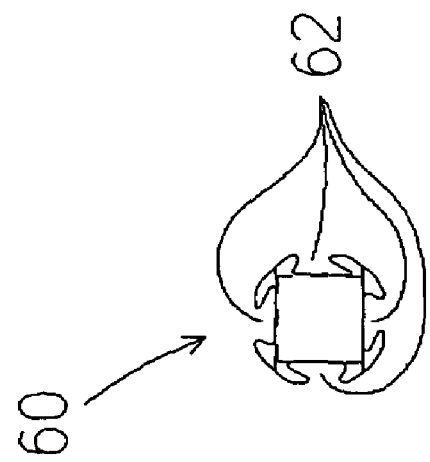
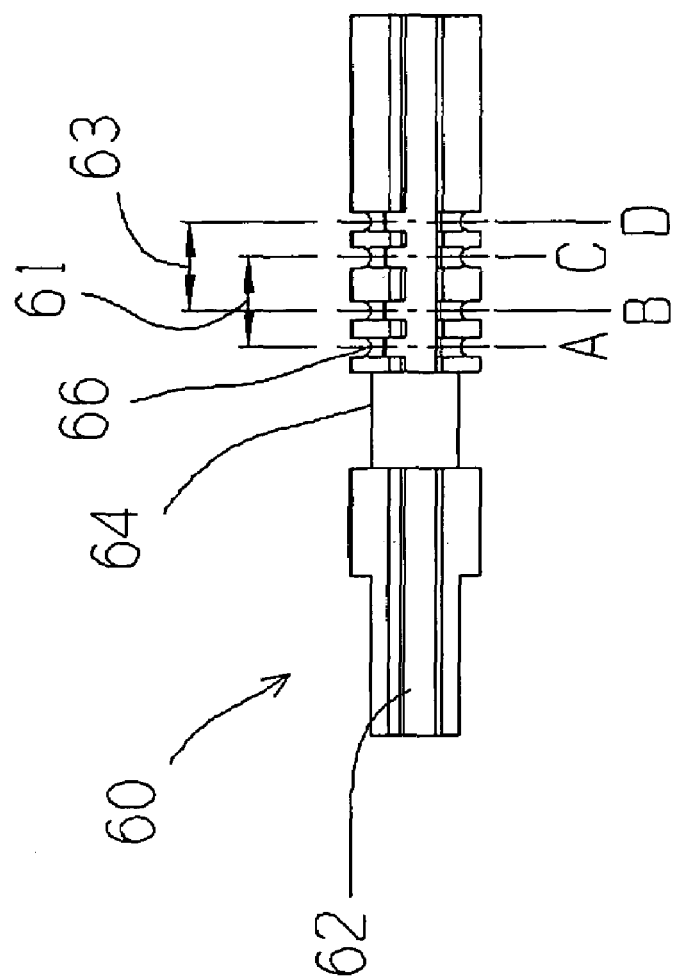
Figure 6
Figure 5

WIRE CHOPPER MODULE FOR EDM SYSTEM

CROSS REFERENCE TO RELATED APPLICATIONS

This application is a divisional of application Ser. No. 10/139,478, filed May 6, 2002 now U.S. Pat. No. 6,948,413.

BACKGROUND OF THE INVENTION

1. Field of the Invention

This invention generally relates to the processing of used electrode discharged from an electrical discharge machining (EDM) system and more particularly to a wire chopper module for shearing used electrode wire into many small pieces which accumulate in a relatively dense pile.

2. Description of the Related Art

The process of electrical discharge machining (EDM) is well known. An electrical potential (voltage) is established between a continuously moving EDM electrode and an electrically conductive workpiece. The potential is raised to a level at which a discharge is created between the EDM electrode and the workpiece. The intense heat generated by the discharge will melt and/or vaporize a portion of both the workpiece and the electrode to thereby remove, in a very small increment, a piece of the workpiece. By generating a large number of such discharges, a large number of increments are removed from the workpiece whereby the workpiece can be cut very precisely to have a desired planar contour. A dielectric fluid is used to establish the necessary electrical conditions to initiate the discharge and to flush debris from the active machining area.

The EDM process erodes the wire electrode as well as the workpiece. Therefore, EDM systems continuously renew the wire electrode from a coil. Spent electrode wire has previously been allowed to accumulate in a reservoir below the EDM system. This approach proved unacceptable because the wire has a tendency for expansion in the reservoir. This necessitates frequent intervention by the operator because the wire forms entanglements, which rapidly fill the space available in the reservoir. It is known to crimp the electrode wire by making it pass between two toothed wheels or also to cut it into small pieces which possess the capability of accumulating in a relatively dense pile. A device for cutting the wire into pieces is described in U.S. Pat. No. 4,016,395.

A continuing problem with prior art wire-chopping devices is the rapid wear of the tool edges used to section the wire. EDM wire is typically comprised of tough metal allows to give it the requisite tensile strength. Chopping this wire results in high wear to cutting surfaces. If cutting surfaces wear to the extent that the wire is no longer chopped cleanly, the wire-chopping device can jam resulting in a machine shutdown.

Reliable processing of spent EDM electrode is essential to reliable operation of EDM equipment, for example, at night or over a weekend. EDM systems frequently require a large capital investment, which motivates the owner to keep the machines in use as continuously as possible. Failure of the electrode disposal device results in expensive downtime. The premium placed on reliable electrode disposal has necessitated frequent service typically including replacement of portions or the entire wire-chopping device to renew the cutting surfaces.

One prior art wire-chopping device comprises a plurality of blades mounted to a rotating shaft. A stationary wire guide orifice is positioned to feed wire into the blades generally transversely to the axis of blade rotation. The wire is sheared transverse to its feed path as the blades pass the exit orifice of the wire guide. The blades and wire guide orifice are constructed of tungsten carbide or similar hardened material to increase their durability. The blades are permanently fixed to a shaft of the wire-chopping device by welding or other known process for fixing a hard cutting edge to a cutting tool. The prior art discloses a wire-chopping device in which the wire guide orifice has two possible locations, each of which guide the spent electrode into axially spaced portions of the cutting blades. When one portion of the cutting blade is dulled, the write guide orifice is repositioned to feed wire toward a fresh cutting surface on the cutting blades. Once the cutting blades are dulled in both available locations, the prior art wire-chopping device must be removed and discarded or remanufactured by inserting a new shaft with new cutting blades.

The prior art wire-chopping devices of the rotating blade/stationary anvil type require frequent replacement to renew the permanently attached blade cutting surfaces. This results in high expense and the necessity to maintain an inventory of remanufactured and/or new wire-chopping devices. There is a need in the art for a wire-chopping device in which the cutting surfaces can be frequently and inexpensively renewed without necessitating replacement of the entire device.

SUMMARY OF THE INVENTION

Briefly stated, a preferred embodiment of the present invention comprises a wire chopper module in which both the stationary and rotating cutting tool edges used to shear spent EDM electrode are both repositionable and replaceable. Repositioning the cutting edges relative to the feed path of the spent electrode greatly extends the serviceable life of each cutting edge by permitting multiple uses of each edge. When all the available cutting edges are used, replacement of the cutting edges is easily accomplished in the field by replacement of an insert carrying the cutting edge. Thus, cutting edges can be renewed more frequently and with less expense, resulting in increased EDM system reliability.

One preferred embodiment of the wire chopper module in accordance with the present invention comprises a frame that supports a shaft for rotation in bearings. The shaft includes a plurality of longitudinal channels configured to receive and retain replaceable inserts. Each of the disclosed cutting inserts includes two cutting surfaces. The shaft includes an arrangement for fixing the cutting inserts in alternative positions along the length of the shaft. A different portion of the cutting edge on the insert is used to shear the wire in each position. In this manner the channel, shaft and replaceable, repositionable, two-edge cutting inserts allow each insert to present four fresh active cutting edges. The inserts are replaceable and repositionable without replacement or extensive disassembly of a wire chopper module in accordance with the present invention.

A removable anvil holder supports an anvil whose cutting edge cooperates with the rotating cutting inserts to shear spent electrode transversely to it feed direction. The anvil holder defines generally conical wire guide orifice that extends from an entrance opening to a smaller exit opening. The exit opening directs the spent electrode over the active cutting edge of the anvil and into the rotating cutting edges of the cutting inserts. A preferred embodiment of the anvil holder includes a slot or opening which receives a removable anvil having a plurality of cutting edges. The slot or opening is configured to permit movement of the anvil relative to the exit opening so that more than one portion of each anvil cutting edge is available to shear the spent electrode.

In accordance with the present invention, one preferred embodiment of the anvil is configured as a square slab of carbide or hard material that is received in the anvil holder in any of eight positions to present eight new cutting edges before requiring replacement. The anvil is moveable relative to the wire guide orifice exit opening so that each of the eight cutting edges on the anvil can be used at least twice. As a result, a wire chopper module in accordance with the present invention can utilize the same anvil to present sixteen new cutting edges, greatly reducing the cost of renewing the stationary cutting edge in the inventive wire chopper module.

A wire chopper module in accordance with the present invention also include a flywheel mounted to the shaft to increase the moment of inertia of the rotating shaft and cutting inserts. This increased moment of inertial helps avoid jams that may occur when cutting surfaces become dull.

An object of the present invention is to provide a new and improved wire chopper module for an EDM system that permits renewal of both the rotating and stationary cutting edges without necessitating major disassembly or replacement of the wire chopper module.

Another object of the present invention is to provide a new and improved wire chopper module for an EDM system that reduces the cost and increases the reliability of EDM system operation.

A further object of the present invention is to reduce the cost and complexity associated with renewing the cutting edges of a wire chopper module for an EDM system.

BRIEF DESCRIPTION OF THE DRAWINGS

Other objects and advantages of the present invention will be apparent from the following detailed description, claims and drawings in which:

FIG. 5 is a side view of a shaft for use in conjunction with the wire chopper module of FIGS. 1–4; and FIG. 6 is a right end view of the shaft of FIG. 5.

DETAILED DESCRIPTION OF THE PREFERRED EMBODIMENT

Figure 1:
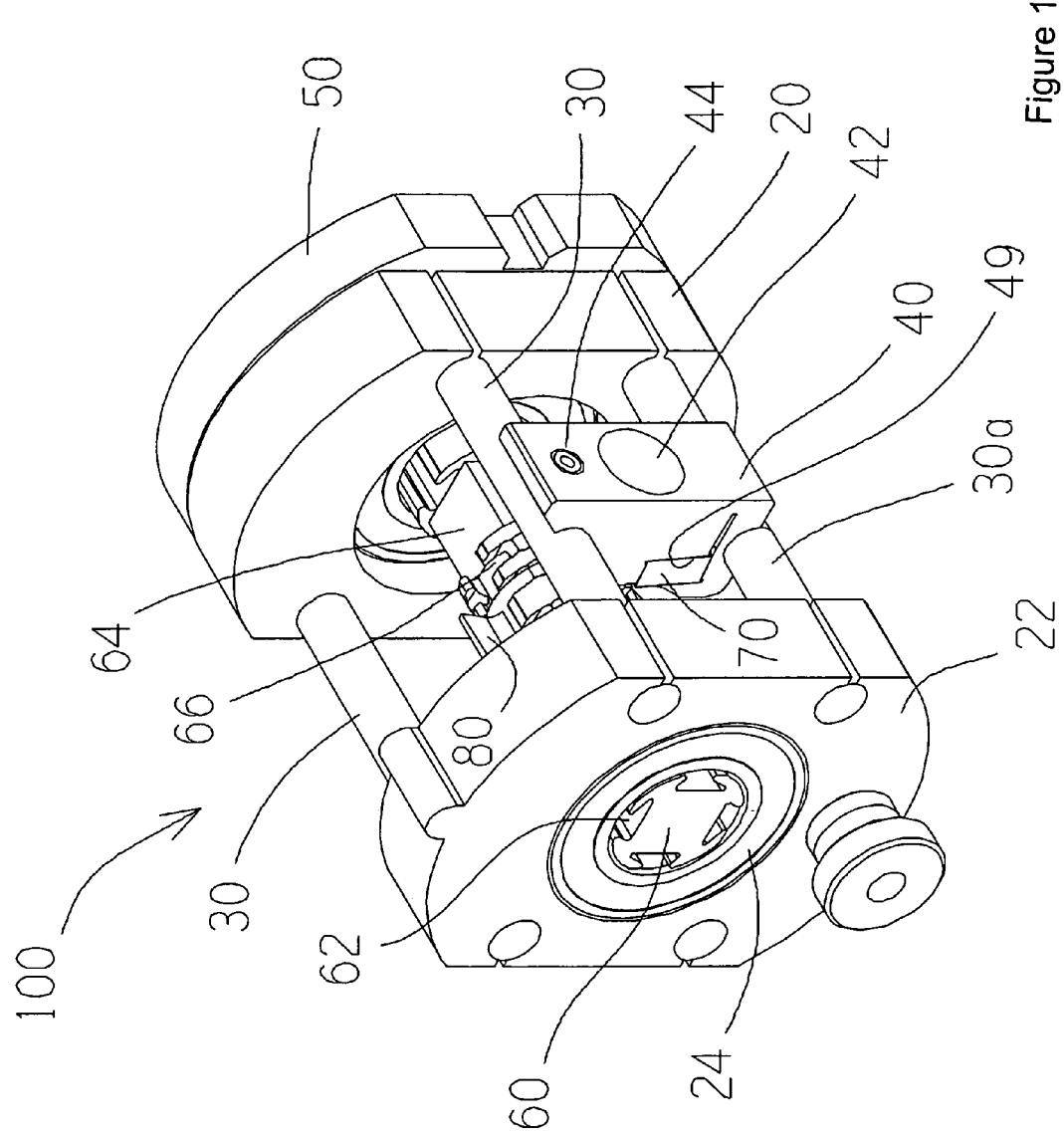
FIG. 1 is a perspective view of a wire chopper module in accordance with the present invention.

With reference to FIGS. 1–6, wherein like numbers refer to similar parts, one preferred embodiment of a wire chopper module in accordance with the present invention is illustrated in FIGS. 1–4. The wire chopper module 100 is inserted in the path of spent wire electrode exiting from an EDM system. The illustrated wire chopper module 100 comprises a frame assembled from a front end cap 22 and a rear end cap 20 that receive four body pins 30, 30a. Bearings 24 are received in each of the end caps 20, 22 to support the shaft 60 for rotation within the frame. In the illustrated embodiment, one of the body pins 30a defines an aid 32 for positioning an anvil holder 40.

The anvil holder 40 of the illustrated preferred embodiment 100 is mounted between two of the body pins 30, 30a. A lower semi-cylindrical cutout 45 on the anvil holder 40 is configured to fit over the body pin 30a at the positioning aid 32. The upper surface 47 of the anvil holder 40 is configured to slide under an adjacent body pin 30 and snap into place such that the anvil holder is compressively engaged between the two body pins. The anvil holder 40 is provided with a jack screw 44 in a threaded bore that serves to jack the upper portion of the anvil holder 40 away from its snapped engagement between the body pins 30, 30a. Driving the jack screw 44 brings it into contact with the body pin 30 and pivots the anvil holder 40 out of snapped engagement.

The anvil holder 40 defines a wire guide orifice 42 in the form of a conical opening. The wire guide orifice 42 extends from an entrance opening to a smaller exit opening 43. The anvil holder 40 also defines a slot or opening 49 for reception of an anvil 70. The anvil 70 is supported in the anvil holder 40 with one of the cutting edges on the anvil and a portion of an anvil surface defining a working portion of the exit opening 43 in the anvil holder 40. By working portion, it is meant that this portion of the exit opening 43 acts in cooperation with the rotating cutting edges to shear the spent electrode (not illustrated).

A preferred embodiment of the anvil 70 is a square slab which can be received in any one of eight positions into the slot 49 defined in the anvil holder 40. It will be apparent that each of these eight positions presents a fresh cutting edge 72 for shearing the EDM electrode as it passes through the wire guide orifice 42.

Figure 2:
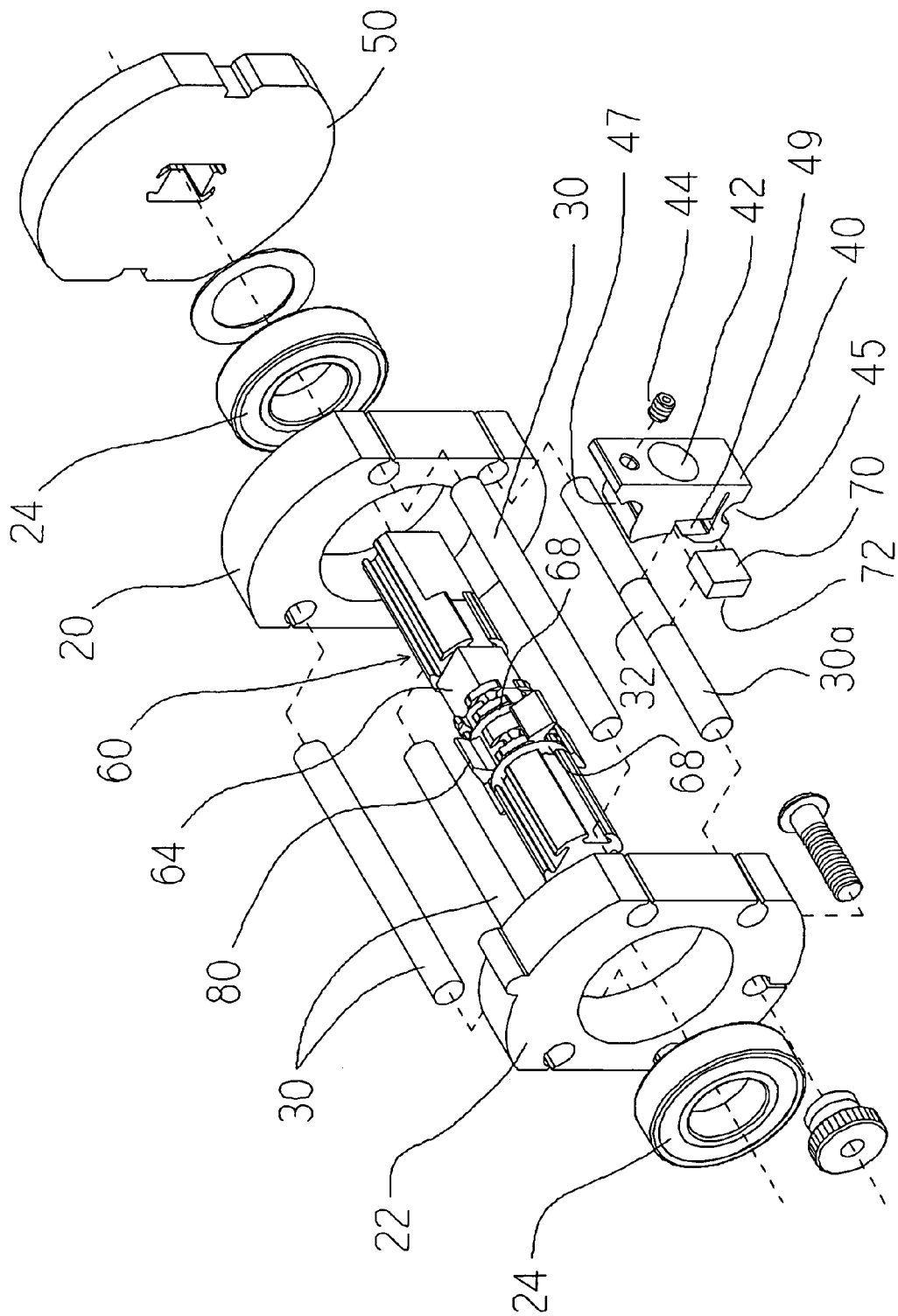
FIG. 2 is an exploded view of the wire chopper module of FIG. 1.

As best seen in FIG. 2, the anvil holder 40 is configured to compressively engage the anvil 70 when the anvil holder is snapped between the body pins 30, 30a. The slot 49 for receiving the anvil 70 allows lateral movement of the anvil relative to the exit orifice 43 when the anvil holder 40 is not fixed between the body pins 30, 30a. This lateral movement permits each of the eight cutting edges 72 of the anvil 70 to be used at least two times. Thus, each anvil 70 can be rotated and positioned to present at least sixteen fresh cutting edge portions before requiring replacement.

The shaft 60 in the illustrated embodiment defines four longitudinally extending channels 62 configured to receive and retain moveable and repositionable cutting inserts 80. Each of the cutting inserts 80 is configured to have two cutting edges 82. When mounted to the shaft 60, one cutting edge 82 is positioned to radially project from the shaft 60 while the other cutting edge 82 is received in a channel 62. The complementary cross-sectional configurations (best seen in FIG. 4) of the channels 62 and the received cutting inserts 80 allow the cutting inserts to move longitudinally along the shaft 60. The shaft 60 also defines a plurality of radial grooves 66 intersecting the channels 62. A shaft portion 64 of reduced cross section permits insertion and removal of inserts 80 from the channels 62 without removal of the shaft 60 from the frame 20, 22, 30, 30a.

Figures 3, 4:
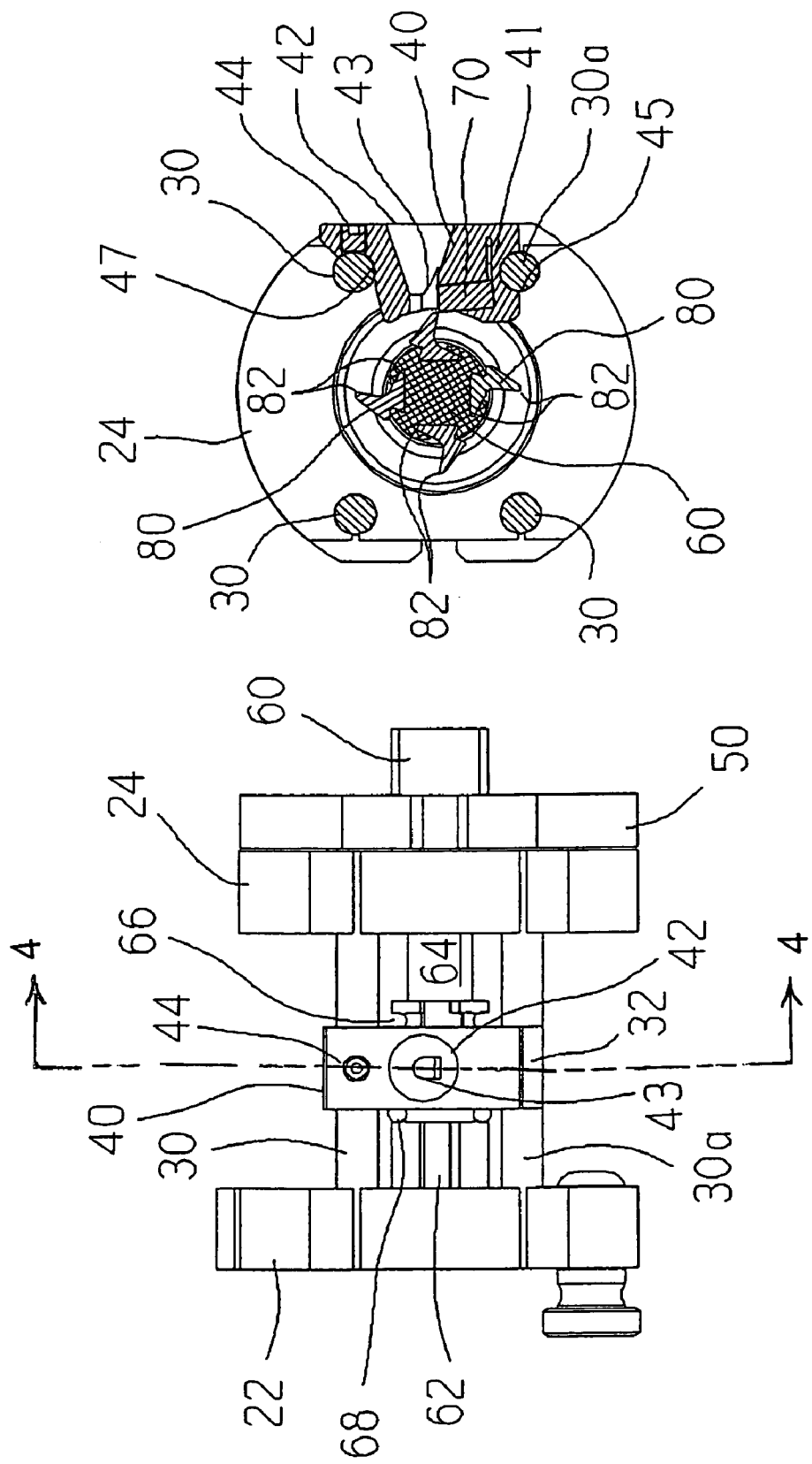
FIG. 3 is a side view of the wire chopper module of FIG. 1.
FIG. 4 is a sectional view through the wire chopper module of FIG. 3 taken along line 4—4 thereof.

With reference to FIGS. 5 and 6, the illustrated embodiment of the shaft 60 defines four longitudinal channels 62 equiangularly arranged around the circumference of the shaft. The shaft 60 also defines four radial grooves 66 intersecting the longitudinal channels 62. Channel portions between the grooves 66 interact with the sectional configuration of the inserts 80, as best seen in FIG. 4, to retain the inserts for rotation with the shaft 60. The radial grooves 66 allow each insert 80 to be retained to the shaft 60 in either of two longitudinal positions 61, 63. Rings 68 disposed in two axially spaced grooves 66 define the longitudinal positions 61, 63 for the inserts by blocking movement of the inserts 80 along the channels 62. Rings placed in grooves A and C (of FIG. 5) define a first position 61 for the inserts 80, while rings received in grooves B and D define a second longitudinal position 63. This arrangement permits each cutting edge 82 on the inserts 80 to be renewed by repositioning the insert 80 so that a fresh portion of the cutting edge 82 is presented adjacent the working portion of the wire guide orifice 42 defined by the anvil 70.

FIG. 4 illustrates the compressed engagement of the anvil holder 40 between two of the body pins 30, 30a. The jackscrew 44 is arranged to push the anvil holder 40 away from one of the body pins 30 and release it from this snapped in, compressed engagement. FIG. 4 also illustrates a slit 41 in the anvil holder 40 adjacent the anvil receiving opening 49. This slit 41 gives some flexibility to the anvil holder 40 around the anvil 70. When released from between the body pins 30, 30a, the anvil holder 40 permits removal and/or repositioning of the retained anvil 70. When installed to the frame, the compressed relationship of the anvil holder 40 between the body pins 30, 30a securely retains the received anvil 70 in its selected position relative to the exit 43 of the wire guide orifice 42.

In the illustrated embodiment, elastic O-rings 68 are utilized to retain the received inserts 80 in a selected longitudinal position. It will be understood by those of skill in the art that this function might be served by snap rings, e-clips, O-rings formed of metal coil spring, or the like. Other configurations for retaining the movable inserts 80 in a selected longitudinal, position are intended to be within the scope of the present invention.

From the above description, it will be understood that each anvil 70 can be repositioned to present sixteen fresh cutting edges and each insert 80 can be repositioned to present four fresh cutting edges. The anvil 70 and each insert 80 can be replaced without necessitating significant disassembly of the wire chopper module 100. By significantly reducing the cost and complexity of renewing the cutting edges of a wire chopper module, the present invention makes it practical to more frequently renew the cutting edges and thereby increase the reliability of EDM equipment incorporating the inventive wire chopper module.

The illustrated embodiment for a wire chopper module 100 in accordance with the present invention also includes a flywheel 50 fixed to the shaft 60. The flywheel 50 increases the rotational inertia of the moving parts of a wire-chopper in accordance with the present invention. This increased inertia allows the inventive wire chopper module 100 to avoid many of the jams that may have occurred in prior art wire-choppers as the cutting surfaces became dulled. A jam that is avoided prevents stoppage of the EDM system and increases productivity.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A chopper module for shearing wire into numerous discrete sections, said chopper module comprising:
   a shaft carrying a plurality of cutting edges and rotatable about an axis of rotation generally perpendicular to a feed path of the wire; and
   an anvil holder defining a wire guide orifice extending from an entrance to an exit having a circumference and an anvil-receiving slot for holding a removable anvil, said anvil comprising a plurality of cutting edges, a portion of one of the cutting edges defining a working portion of the circumference of the exit, said anvil laterally moveable in said anvil holder relative to said exit so that at least two different portions of each cutting edge can define the working portion of the circumference of the exit,
   wherein said anvil holder engages said anvil to fix said anvil in a selected position relative to the circumference of the exit and
   wire fed through the wire guide orifice emerges from the exit and is sheared generally transversely to the feed direction between the shaft-carried cutting edges and the working portion of the circumference of the exit.

2. The chopper module of claim 1, wherein the anvil is configured as a slab having parallel opposed first and second square faces and said anvil is receivable in the anvil holder so that at least one portion of each of the four edges of the first and second faces is positionable to define the working portion of the circumference of the exit.

3. The chopper module of claim 1, comprising:
   a frame supporting the shaft for rotation,
   wherein the anvil holder is mounted to the frame and engagement of the anvil holder with the frame compresses the anvil holder against said received anvil to fix the anvil in a selected position relative to the circumference of the exit.

4. The chopper module of claim 1, comprising a flywheel fixed to said shaft for rotation therewith.

5. A chopper module for shearing wire into numerous discrete sections, said chopper module comprising:
   a shaft carrying a plurality of cutting edges and rotatable about an axis of rotation generally perpendicular to a feed path of the wire;
   a frame supporting the shaft for rotation; and
   an anvil holder defining a wire guide orifice extending from an entrance to an exit having a circumference and holding a removable anvil in fixed position relative to the rotating shaft, said anvil comprising a plurality of cutting edges and positioned so that a portion of one of the cutting edges defines a working portion of the circumference of the exit,
   wherein the anvil holder defines an anvil-receiving slot, the anvil holder is mounted to the frame and engagement of the anvil holder with the frame compresses the anvil holder against said received anvil to fix the anvil in a selected position relative to the circumference of the exit.

* * * * *